(12) United States Patent
Brohlin et al.

(10) Patent No.: US 11,569,673 B2
(45) Date of Patent: Jan. 31, 2023

(54) CHARGE CONTROL CIRCUITRY IN A WIRELESS POWER RECEIVER

(71) Applicant: TEXAS INSTRUMENTS INCORPORATED, Dallas, TX (US)

(72) Inventors: Paul LeRoy Brohlin, Parker, TX (US); Stephen Christopher Terry, San Jose, CA (US); Deepak Mohanlal Khanchandani, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/540,964

(22) Filed: Aug. 14, 2019

(65) Prior Publication Data

US 2019/0372397 A1    Dec. 5, 2019

Related U.S. Application Data

(60) Division of application No. 15/959,443, filed on Apr. 23, 2018, now abandoned, which is a continuation of application No. 15/131,732, filed on Apr. 18, 2016, now Pat. No. 9,954,402, which is a continuation of application No. 12/838,298, filed on Jul. 16, 2010, now Pat. No. 9,318,897.

(60) Provisional application No. 61/227,332, filed on Jul. 21, 2009.

(51) Int. Cl.
*H02J 7/00* (2006.01)
*H02J 50/12* (2016.01)

(52) U.S. Cl.
CPC ............ *H02J 7/0071* (2020.01); *H02J 50/12* (2016.02); *H02J 7/00714* (2020.01); *H02J 7/007182* (2020.01)

(58) Field of Classification Search
CPC ............ H02J 50/12; H02J 7/025; H02J 7/045
USPC .......................................... 307/104; 320/108
See application file for complete search history.

(56) References Cited

U.S. PATENT DOCUMENTS

| | | |
|---|---|---|
| 5,586,019 A | 12/1996 | Mukogawa |
| 5,991,170 A | 11/1999 | Nagai et al. |
| 6,747,548 B1 * | 6/2004 | Yamaguchi ........ G06K 19/0701 340/10.1 |
| 7,656,127 B1 * | 2/2010 | Shutt ..................... H01M 10/48 320/134 |
| 7,764,046 B2 | 7/2010 | Osada |
| 7,859,870 B1 * | 12/2010 | Schutten ............... H02M 3/337 363/56.02 |
| 7,880,338 B2 | 2/2011 | Jin |
| 8,090,550 B2 | 1/2012 | Azancot et al. |
| 8,204,531 B2 | 6/2012 | Jin et al. |
| 8,487,478 B2 * | 7/2013 | Kirby ..................... H02J 50/12 307/104 |
| 8,536,736 B2 * | 9/2013 | Abramo .................. H02J 50/80 307/104 |
| 9,022,293 B2 * | 5/2015 | Osada ............. G06K 19/07779 235/492 |

(Continued)

*Primary Examiner* — Alfonso Perez Borroto
(74) *Attorney, Agent, or Firm* — Mandy Barsilai Fernandez; Frank D. Cimino

(57) ABSTRACT

An embodiment of the invention provides a method for reducing data corruption in a wireless power transmission system. Power is transmitted from a primary coil to a secondary coil by induction. The voltage induced on the secondary coil by induction is rectified. The change in current supplied to a load configured to be coupled to the wireless power transmission system is limited.

15 Claims, 4 Drawing Sheets

(56) References Cited

U.S. PATENT DOCUMENTS

| | | |
|---|---|---|
| 2005/0068019 A1* | 3/2005 | Nakamura ............ H02J 7/0049 |
| | | 323/355 |
| 2005/0269965 A1 | 12/2005 | Sato |
| 2006/0129498 A1 | 6/2006 | Baraty |
| 2006/0287007 A1 | 12/2006 | Veselic et al. |
| 2007/0290655 A1 | 12/2007 | Nate et al. |
| 2008/0136646 A1 | 6/2008 | Friedrich |
| 2008/0297107 A1 | 12/2008 | Kato et al. |
| 2008/0307242 A1 | 12/2008 | Qu |
| 2009/0021219 A1* | 1/2009 | Yoda ...................... H02J 50/12 |
| | | 320/137 |
| 2009/0079271 A1* | 3/2009 | Jin ......................... H02J 50/70 |
| | | 307/104 |
| 2009/0224609 A1 | 9/2009 | Cook et al. |
| 2009/0267641 A1 | 10/2009 | Chen et al. |
| 2009/0286470 A1* | 11/2009 | Mohammadian .... H04B 5/0037 |
| | | 455/7 |
| 2010/0007307 A1 | 1/2010 | Baarman et al. |
| 2010/0256831 A1* | 10/2010 | Abramo ................. H02J 50/12 |
| | | 700/286 |

\* cited by examiner

CHARGE CONTROL CIRCUITRY IN A WIRELESS POWER RECEIVER

CROSS-REFERENCE TO RELATED APPLICATION

This application is a divisional of prior application Ser. No. 15/959,443, filed Apr. 23, 2018, now abandoned;

Which was a continuation of prior application Ser. No. 15/131,732, filed Apr. 18, 2016, now U.S. Pat. No. 9,954,402, granted Apr. 24, 2018;

Which was a continuation of prior application Ser. No. 12/838,298, filed Jul. 16, 2010, now U.S. Pat. No. 9,318,897, granted Apr. 19, 2016;

Which claims priority to U.S. Provisional Application No. 61/227,332, filed Jul. 21, 2009, the entirety of which are incorporated by reference herein.

BACKGROUND

Inductive coupling, often called magnetic coupling, couples magnetic energy from one coil to another coil. Inductive coupling may be used in transformers to change a voltage on a primary coil (also called a winding) to a higher or lower voltage on a secondary coil. For example, high voltage power lines use transformers to "step down" high voltages on power lines to lower voltages (e.g. 120 volts) that may be used in homes. Transformers may be used to isolate one electrical system from another electrical system.

The transfer of energy can be more efficient if a magnetic medium such as iron is used. However, energy may be transferred through a medium such as air from one coil to another coil. Because inductive coupling does not need an electrical conductor to transfer energy from one coil to another coil, batteries in electronic devices may be charged without requiring an electrical cord to be attached to the electronic device. For example, many electric toothbrushes use inductive coupling to recharge batteries in the electrical toothbrushes. These electric toothbrushes are charged by simply placing them on a stand that contains a source of magnetic energy.

Inductive coupling may be used to transfer electrical power as in the case where high voltage transformers transfer power from high voltage power lines to homes. In addition to transferring power, inductive coupling may be used for communication. For example, a transformer may be used to transfer an analog signal (e.g. an audio signal) from an amplifier to a loudspeaker in order to produce sound. In addition, digital signals may be transmitted from one coil to another coil in order to facilitate communication.

Inductive coupling may be used to transfer power and transmit information concurrently. For example, backscatter modulation is a method of communicating in an inductively coupled system where power is transferred from the power transmitter to the power receiver and information is communicated from the power receiver back to the power transmitter. When inductive coupling is used to transfer power and transmit information concurrently, the transfer of power may corrupt the transmission of information. For example, in a system using backscatter modulation, the charging of a battery can create digital pulses that are transmitted from a receiver to the transmitter corrupting data that is communicated from the receiver to the transmitter.

DETAILED DESCRIPTION

The drawings and description, in general, disclose embodiments of a method and apparatus for reducing corruption of communication in a wireless power transmission system. In summary, a primary coil in a transmitter generates a magnetic field which is magnetically coupled to a secondary coil of a receiver. The magnetic field coupled from the primary coil to the secondary coil induces an AC (alternating current) voltage on the secondary coil, which is then rectified to generate a DC (direct current) voltage at the rectifier node. This DC rectifier voltage will cause a current to flow into an output load. A charge control circuit placed between the rectifier circuit and the load limits the change in current to the load.

When a charge control circuit is not placed between the rectifier circuit and the load, the current supplied to the load may change significantly. The current supplied to the load may change significantly due to the dynamic load requirements associated with power transmission in a cellular phone. Change in the current supplied to the load induces a change in current on the secondary coil in the receiver. Change in current on the secondary coil induces a signal to be magnetically coupled from the receiver to the transmitter. The signal magnetically coupled from the receiver to the transmitter may corrupt communication being sent concurrently from the receiver to the transmitter.

For example, in a wireless power transmission system that uses backscatter modulation, the intended communication from the receiver to the transmitter may be corrupted by a signal induced on the secondary coil by a change in current to the load being charged. To reduce corruption of communication while a load is being charged, a charge control circuit is placed between a rectifier and a load. Because the change in current to the load is reduced when the charge control circuit is placed between the rectifier and the load, corruption of communication from the receiver to the transmitter is reduced. The function of the charge control circuit within a wireless power transmission system will be discussed later in more detail.

Figure 1:
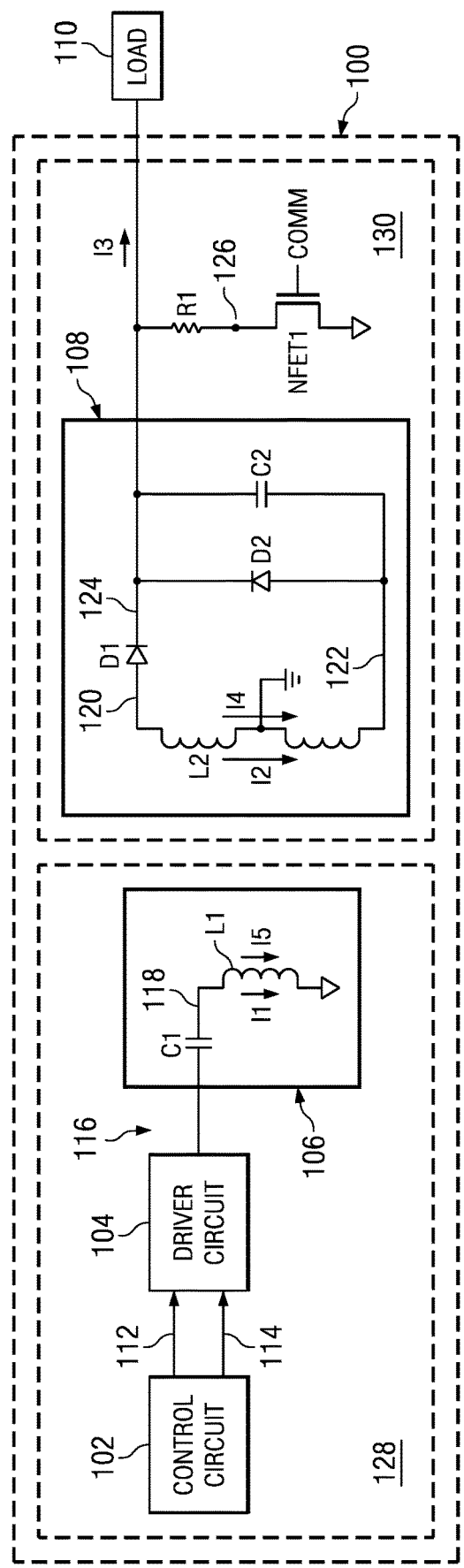
FIG. 1 is a schematic diagram of an embodiment of a wireless power transmission system.

Power may be transferred from a transmitter to a receiver concurrently with communication being sent from the receiver to the transmitter. Because power is being transferred concurrently with communication being sent, power induced in the receiver can create a signal that is sent from the receiver to the transmitter that may corrupt the intended communication sent from the receiver to the transmitter. FIG. 1 illustrates how communication may be corrupted in a wireless power transmission system 100 that uses backscatter modulation.

A control circuit 102 controls a driver circuit 104 through electrical connections 112 and 114. The driver circuit 104 drives a current I1 through the resonant circuit 106. In this example, the resonant circuit is an LC (inductor-capacitor)

circuit containing a capacitor C1 and a coil L1 in series. Other resonant circuits may be used such as an LLC (inductor-inductor-capacitor) circuit. In this example, the current I1 is approximately sinusoidal.

When current I1 is drawn through coil L1, an approximately sinusoidal current I2 is induced on coil L2 in the rectifier circuit 108. Rectifier circuit 108 contains a center-tapped coil, two diodes D1 and D2, and a capacitor C2. The rectifier circuit 108 in this example is a full-wave center-tapped rectification circuit; however, other types of rectification may be used such as full-wave non-center-tapped rectification or half-wave rectification. The rectifier circuit 108 provides a voltage on node 124. The voltage on node 124 causes a current I3 to charge the load 110. The load 110, for example, may be a battery, a battery charger or a power supply.

In this example, the current I3 that charges the load 110 also causes a change in current I4 in the center-tapped coil L2. The change in current I4 in the center-tapped coil L2 induces a change in current I5 in the coil L1. The change in current I5 in the coil L1 may corrupt communication from the receiver 130 to the transmitter 128. Modulating the voltage on node COMM, creates communication from the receiver 130 to the transmitter 128 by backscatter modulation. The change in current I5 due to the change in current I3 into the load 110 may corrupt the communication sent by the modulation of node COMM.

In an embodiment of the invention, the corruption of communication from the receiver 130 to the transmitter 128 may be reduced by limiting the change in current I3 charging the load 110. In an embodiment of the invention, the change in current I3 for charging the load 110 is limited by inserting a charge control circuit between the rectifier circuit 108 and the load 110. Several embodiments of the charge control circuit and how they are used in a wireless power transmission system that uses backscatter modulation will now be discussed in order to best explain the applicable principles and their practical application.

Figure 2:
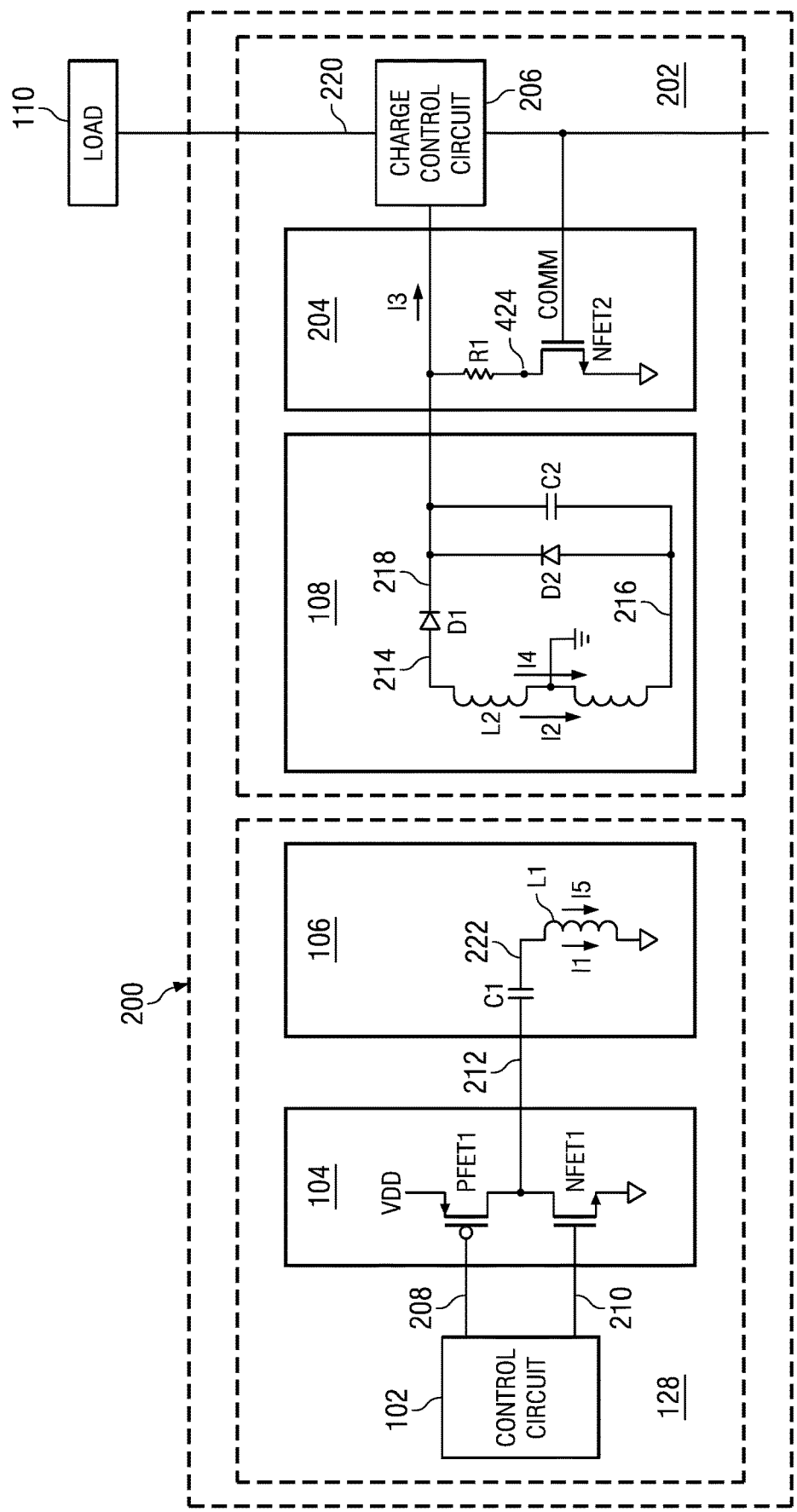
FIG. 2 is a schematic diagram of an embodiment of a wireless power transmission system with a charge control circuit.

FIG. 2 is a schematic drawing of an embodiment of a wireless power transmission system 200 that uses backscatter modulation wherein corruption of communication is limited. A control circuit 102 controls a driver circuit 104 through electrical connections 208 and 210. The driver circuit 104 drives a current I1 through the resonant circuit 106. The driver circuit 104, in this example, contains a PFET (p-type field-effect transistor) PFET1 and an NFET (n-type field-effect transistor) NFET1; however, other transistors may be used. An input 208 to the driver circuit 104 is connected to the gate of PFET1 and an input 210 of the driver circuit 104 is connected to the gate of NFET1. The source of PFET1 is connected to VDD and the source of NFET is connected to ground. The drains of PFET1 and NFET2 are connected to the output 212 of the driver circuit 104.

In this example, the resonant circuit 106 is an LC (inductor-capacitor) circuit containing a capacitor C1 and a coil L1 in series. Other resonant circuits may be used such as an LLC (inductor-inductor-capacitor) circuit. In this example, the current I1 is approximately sinusoidal. When current I1 is drawn through coil L1, an approximately sinusoidal current I2 is induced on coil L2 in the rectifier circuit 108.

Rectifier circuit 108 contains a center-tapped coil L2, two diodes D1 and D2, and a capacitor C2. The rectifier circuit 108, in this example, is a full-wave center-tapped rectification circuit; however, other types of rectification may be used such as full-wave non-center-tapped rectification or half-wave rectification. The anode of diode D1 is connected to a terminal of center-tapped coil L2 and the anode of diode D2 is connected to another terminal of center-tapped coil L2. The center of center-tapped coil L2 is grounded. The cathode of diode D1, the cathode of diode D2 and a terminal of C2 are connected to the output of the rectifier circuit 108 at node 218. The rectifier circuit 108 provides a voltage on node 218. The voltage on node 218 causes a current I3 to flow. In an embodiment of the invention, the charge control circuit 206 limits the change in current I3.

Because the change in current I3 is limited, the change in current I4 in the center-tapped coil L2 is substantially reduced. Reducing the change in current I4 in the center-tapped coil L2 also reduces the change in current I5 in the coil L1. Because the change in current I5 in the coil L1 is reduced, the probability of corruption of communication from the receiver 202 to the transmitter 128 is also reduced. Modulating the voltage on node COMM of the communication switch 204, creates communication from the receiver 202 to the transmitter 128 by backscatter modulation.

A communication switch 204 includes resistor R1 and NFET NFET2 in series. When the change in current I3 is reduced by the charge control circuit 206, the communication created by the communication switch 204 has a lower probability of being corrupted.

In a first embodiment of the charge control circuit 206, the charge control circuit 206 measures current I3 being supplied to the load 110. After measuring the current I3, the control circuit 206 sets a current regulation threshold below the present value of current I3. Setting the current regulation threshold below the present value of current I3 forces the charge control circuit 206 to operate in current limit. Operating in current limit reduces the change in current I3. As a result, the probability of communication being corrupted to the transmitter 128 is reduced. In this first embodiment of a charge control circuit 206, the load 110 that is charged may be a battery, a battery charger or a power supply. However, the load is not limited to a battery, a battery charger or a power supply.

In a second embodiment of the charge control circuit 206, the charge control circuit 206 measures current I3 being supplied to the load 110. After measuring the current I3, the control circuit 206 sets a current regulation threshold slightly above the present value of current I3. Typically, a 200 ma current pulse is used for communication. Therefore, if the change in current increases by 100 ma or less, communication will not be corrupted. However, if the current pulse used for communication is increased, the current regulation threshold may also be raised without corrupting communication. In this second embodiment of a charge control circuit 206, the load 110 that is charged may be a battery, a battery charger or a power supply. However, the load is not limited to a battery, a battery charger or a power supply.

In a third embodiment of the charge control circuit 206, the charge control circuit 206 measures current I3 being supplied to the load 110. When the measured current is 200 ma or less, the current regulation threshold is set at 200 ma. One reason for setting the current regulation limit to 200 ma when the measured current I3 is 200 ma or less is to protect against the wireless power transmission system shutting down based on an under-voltage or an under-current condition. In this third embodiment of a charge control circuit 206, the load 110 that is charged may be a battery, a battery charger or a power supply. However, the load is not limited to a battery, a battery charger or a power supply.

In a fourth embodiment of the charge control circuit 206, when there is no communication between the receiver 202 and the transmitter 128, no current regulation threshold is set. Instead, the change in current I3 may be increased to the load 110. A full charge current may be used during this condition because there is no communication between the receiver 202 and the transmitter 128. Because there is no communication between the receiver 202 and the transmitter 128, there is no communication to corrupt. In this fourth embodiment of a charge control circuit 206, the load 110 that is charged may be a battery, a battery charger or a power supply. However, the load is not limited to a battery, a battery charger or a power supply.

Figure 3:
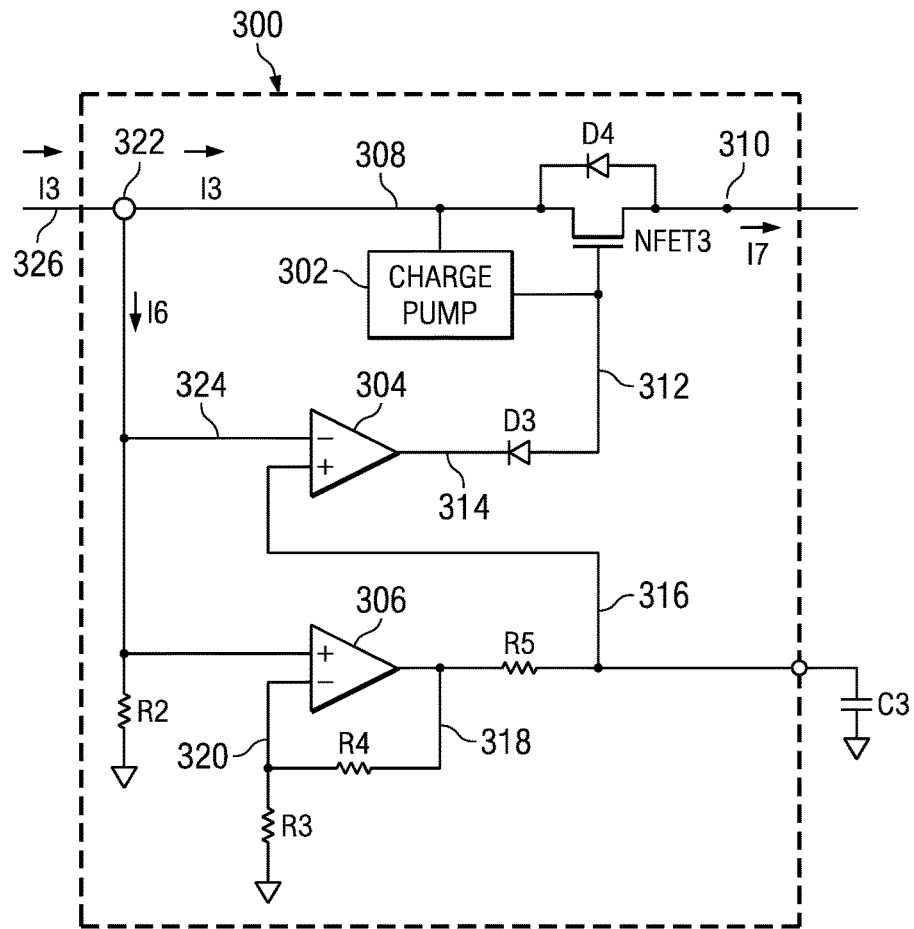
FIG. 3 is a schematic diagram of a first embodiment of a charge control circuit.

FIG. 3 is a schematic drawing of an embodiment of a charge control circuit 300. The charge control circuit 300 in FIG. 3 acts as a current limiter whose threshold tracks the present value of current I3 through device NFET3. In this charge control circuit 300, the element 322 acts as a current sensor 322. The current sensor 322 allows charge current I3 to pass from the input 326 of the charge control circuit 300 to node 308 substantially unchanged. An output from current sensor 322 is connected to node 324. The current I6 drawn through resistor R2 is a scaled version of the current I3 at node 308. The current I6 is approximately equal to I3/k, where the value of k is typically between 100 and 1000. Current I6 flows through the resistor R2 creating a voltage at node 324 that is proportional to the current I3.

In FIG. 3, op-amp 306 and associated resistors R3 and R4 create a non-inverting gain function that amplifies the voltage at node 324 by a factor, typically 1.05. However, other factors are also possible. The resistor R5 and the capacitor C3 form a low-pass filter that acts to hold the amplified voltage at node 316. The charge pump 302 acts as current source that will turn on the gate of NFET3 and provide a bias voltage for the gate of NFET3.

An embodiment of the current limit function of the charge control circuit 300 operates as follows: when the load current I7 pulled from node 310 changes quickly (quickly in this embodiment means approximately 10 times faster than the time constant T4, where T4 equals (R5×C3) seconds), then the voltage at node 324 will increase proportionally to the change in load current I7 while the voltage at node 316 does not substantially change at the same time. Therefore, a negative differential voltage is created at the input of op-amp 304 that will cause current to flow into op-amp 304. The current flowing into op-amp 304 will lower the voltage on the gate 312 of NFET3 and inhibit the change in load current I7.

A negative feedback loop formed in the charge control circuit 300 limits the rate at which the load current I7 can change by the time constant T4. The time constant T4 can be changed by varying the value of the external capacitor C3. When the time constant T4 is slower than the communication time, the circuit 300 will improve communication by shielding fast current changes from a transmitter.

Other embodiments of charge control circuit 300 are also possible. For example, an enabling function may be added that would turn on charge control circuit 300 during the communication period and then turn it off when communication is complete. In this way, the charger can quickly deliver its full current when communication is not active.

In the embodiment of the charge control circuit 300 shown in FIG. 3, the charge control circuit 300 sets a tracking current limit which is used during voltage regulation. However, another amplifier (not shown) may be added to the charge control circuit 300 to set a maximum current limit independent of the voltage on capacitor C3. The charge current into node 308 will not run away because the tracking current limit will be active for relatively short periods of time when power is applied.

Figure 4:
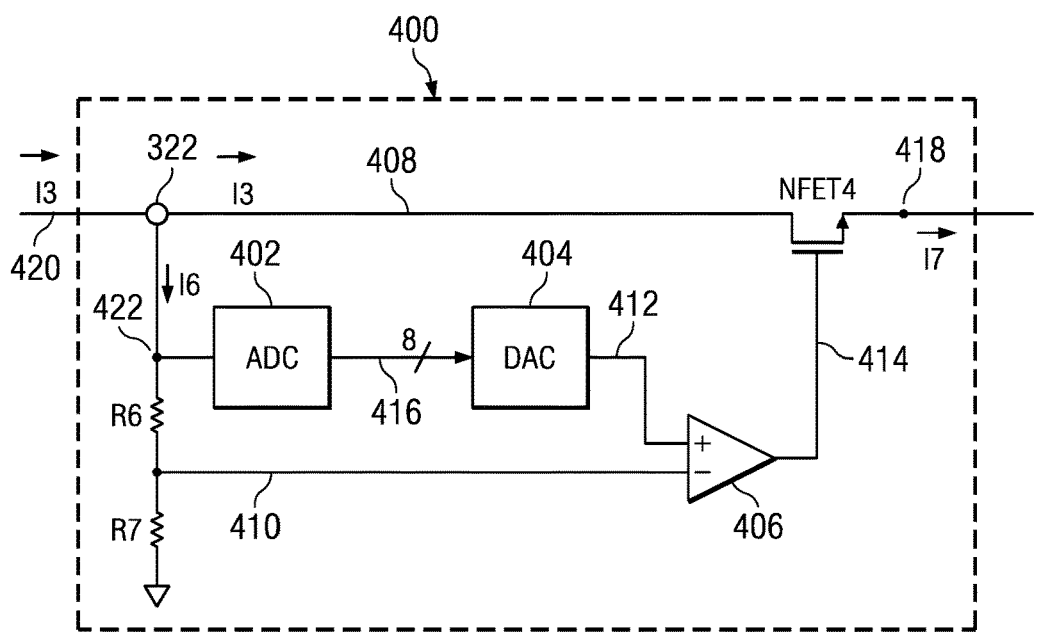
FIG. 4 is a schematic diagram of a second embodiment of a charge control circuit.

FIG. 4 is a schematic drawing of an embodiment of a charge control circuit 400. The charge control circuit 400 in FIG. 4 acts as a current limiter whose threshold tracks the present value of current I3 through device NFET4. In this charge control circuit 400, the element 322 acts as a current sensor 322. The current sensor 322 allows charge current I3 to pass from the input 420 of the charge control circuit 400 to node 408 substantially unchanged. An output from current sensor 322 is connected to node 422. The current I6 drawn through resistor R6 and R7 is a scaled version of the current I3 at node 408. The current I6 is approximately equal to I3/k, where the value of k is typically between 100 and 1000. Current I6 flows through the resistors R6 and R7 creating voltages at nodes 422 and 410 that are proportional to the current I3.

In this embodiment, the input of the charge control circuit 400 is connected to node 420. A voltage proportional to the change in current I3 on node 410 is presented to a first input of the op-amp 406. In this embodiment, a voltage divider is created by resistor R6 in series with resistor R7. In this example, the value of R6 is equal to (0.05)*R7. Because the value of R6 is equal to (0.05)*R7, the voltage on node 410 is approximately (0.95) times the voltage on node 422.

Node 408 is connected to the current sensor 322 and the drain of NFET NFET4. Node 422 is connected to the input of ADC 402 and resistor R6. The output 416 of the ADC 402, an 8-bit bus, is connected to the input of the DAC (digital-to-analog converter) 404. An 8-bit bus is used in this example; however, the output 416 of the ADC 402 may be any size bus. For example, the bus may be a 16 bit bus. The DAC 404 converts the digital signal from the output 416 of the ADC 402 to an analog signal on node 412. The voltage on node 412 is presented to a second input of the op-amp 406.

The op-amp 406 compares the voltages on nodes 412 and 410. When the voltage on node 412 is higher than the voltage on node 410, the op-amp 406 increases the voltage on node 414. The node 414 is connected to the gate of NFET4. When the voltage on node 412 is lower than the voltage on node 410, the op-amp 406 decreases the voltage on node 414. Changing the voltage on node 412 based on the current I6 drawn through resistors R6 and R7 regulates the current drawn on node 408. By regulating the current through NFET4, the current drawn on node 408 is substantially constant. Keeping the current approximately constant on node 408 reduces corruption in communication from the receiver 202 to the transmitter 128.

The use of the ADC 402 and the DAC 404 between nodes 408 and 412 allows for more precise control of the tracking current limit. In addition, the charge control circuit 400 does not need an external capacitor as in the embodiment of the charge control circuit 300 shown in FIG. 3.

Figure 5:
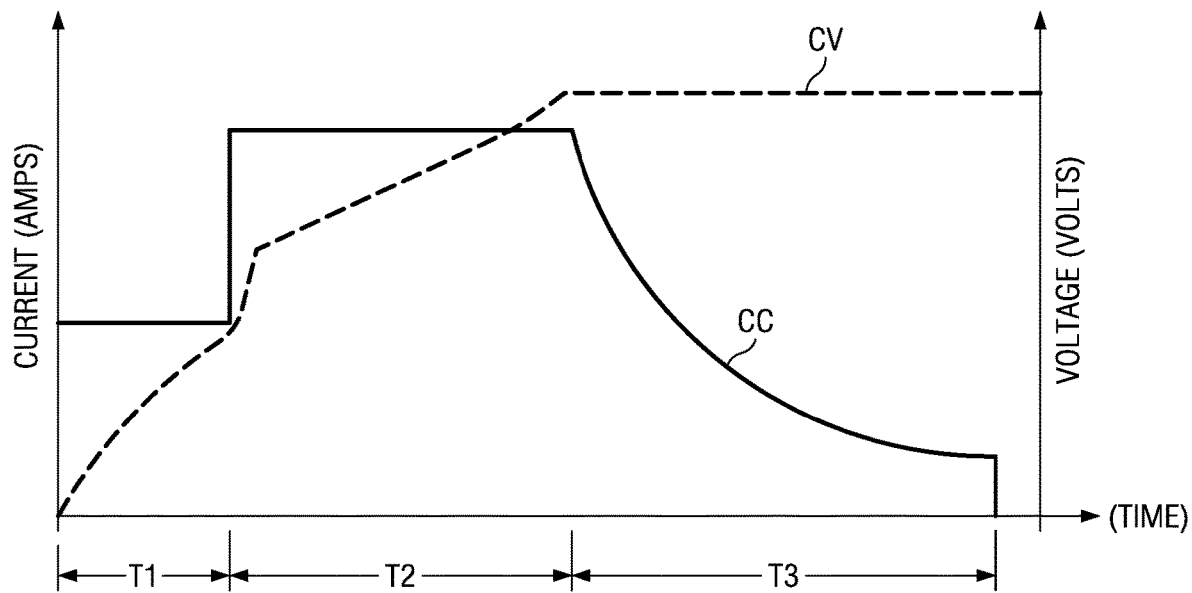
FIG. 5 is a plot of an embodiment of a charging profile for a lithium-ion battery as a function of time and current.

An embodiment of the invention may be used to charge, for example, lithium-ion batteries. A typical charging profile for lithium-ion batteries is shown in FIG. 5. The charging of a lithium-ion battery begins with a preconditioning period T1. During this time, the charge current CC is relatively low and held at a constant value. Because the charge current CC is a constant value, the charge voltage CV increases linearly until a minimum charge voltage is reached.

When the minimum charge voltage is reached, the precondition phase T1 ends and the current regulation phase or "fast charge" phase T2 begins. During the current regulation phase T2, the charge current CC is increased and held at a constant value. Because the charge current CC is a constant value, the charge voltage CV increases linearly until the lithium-ion battery is nearly charged.

When the lithium-ion battery is nearly charged, the current regulation phase T2 ends and the voltage regulation phase T3 begins. During the voltage regulation phase T3, the charge current CC tapers until the charge is complete. During the voltage regulation phase T3, the charge current CC is no longer constant. Because the charge current CC is changing during the voltage regulation phase T3, a change in current will also occur in a coil L2 of a receiver 202. When a change in current occurs in the coil L2, communication sent from the receiver 202 to the transmitter 128 may be corrupted.

An embodiment of the invention may be used to lower the probability of communication being corrupted during the voltage regulation phase T3 of charging lithium-ion batteries in a wireless power transmission system. The voltage regulation phase T3 of charging lithium-ion batteries is shown in FIG. 5 where the charging current CC is reduced over a time period. The use of a charge control circuit, for example the charge control circuit 300 shown in FIG. 3, during the voltage regulation phase T3 of charging lithium-ion batteries, will reduce the change in charging current CC. Because the change in charging current CC is reduced, the probability of corruption of communication from the receiver 202 to the transmitter 128 will be reduced as well.

Figure 6:
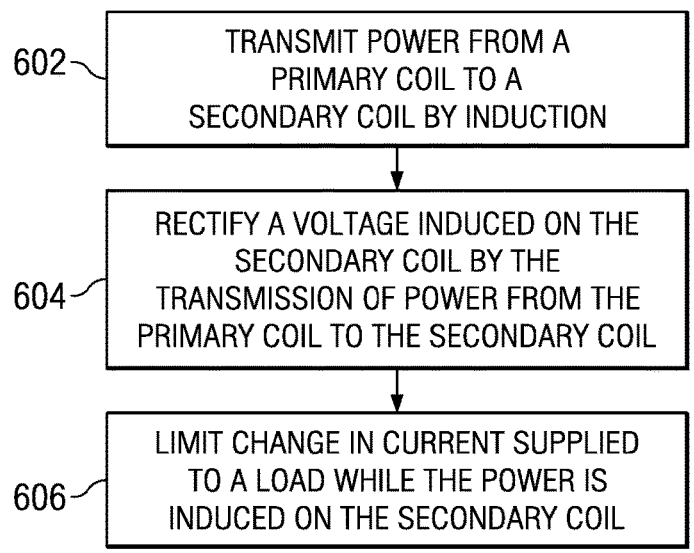
FIG. 6 is a flow chart of an embodiment of a method for reducing corruption of communication in a wireless power transmission system.

FIG. 6 is a flow diagram of an embodiment of a method of reducing corruption of communication in a wireless power transmission system 200. In step 602, power is transmitted from a primary coil L1 to a secondary coil L2 by induction. In step 604, the voltage induced on the secondary coil L2 by the transmission of power from the primary coil L1 to the secondary coil L2 is rectified. In step 606, the change in current supplied to a load 110 while power is induced on the secondary coil L2 is limited. Because the change in current is limited, corruption of communication from a receiver 202 to a transmitter 128 in a wireless transmission system 200 is reduced.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A wireless power receiver comprising:
   an inductor having first and second terminals;
   a diode having first and second terminals, the first terminal of the diode coupled to the first terminal of the inductor;
   a capacitor having first and second terminals, the first terminal of the capacitor coupled to the second terminal of the diode, the second terminal of the capacitor coupled to the second terminal of the inductor;
   a resistor having first and second terminals, the first terminal of the resistor coupled to the second terminal of the diode and to the first terminal of the capacitor;
   a first transistor having a first terminal coupled to the second terminal of the resistor, and having a control terminal; and
   circuitry comprising:
   a second transistor having a first and second terminals and a control terminal, the first terminal of the second transistor coupled to the first terminals of the resistor and the capacitor and to the second terminal of the diode; and
   in which the circuitry is configured to limit a change in a current at the second terminal of the second transistor responsive to comparing a representation of a current of at the first terminal of the second transistor to a threshold.

2. The receiver of claim 1 in which the circuitry includes:
   a first operational amplifier (op-amp) having first and second inputs and an output, the first input coupled to the first terminals of the second transistor, the resistor, and the capacitor and to the second terminal of the diode, the output coupled to the control terminal of the second transistor;
   a second op-amp having a first input coupled to the first input of the first op-amp, and having an output;
   a second resistor having first and second terminals, the first terminal of the second resistor coupled to the output of the second op-amp, the second terminal of the second resistor coupled to the second input of the first op-amp; and
   a second capacitor having a terminal coupled to the second terminal of the second resistor and to the second input of the first op-amp.

3. The receiver of claim 1 in which the circuitry includes:
   an operational amplifier (op-amp) circuitry having first and second inputs, and having an output coupled to the control terminal of the second transistor;
   an analog to digital converter (ADC) having an input coupled to the first terminals of the second transistor, the resistor, and the capacitor and to the second terminal of the diode, and having an output; and
   a digital to analog converter having an input coupled to the output of the ADC, and having an output coupled to the first input of the op-amp.

4. The receiver of claim 3 in which the threshold is set based on a resistor divider network coupled to the second input of the op-amp, the resistor divider network including:
   a second resistor having a first terminal coupled to the input of the ADC, and a second terminal coupled to the second input of the op-amp; and
   a third resistor having a terminal coupled to the second terminal of the second resistor and to the second input of the op-amp.

5. The receiver of claim 1 in which the diode is a first diode, and the receiver further comprises a second diode having first and second terminals, the first terminal of the second diode coupled to the first terminals of the second transistor, the resistor, and the capacitor and to the second terminal of the first diode, the second terminal of the second diode coupled to the second terminals of the inductor and the capacitor.

6. The receiver of claim 5 in which the inductor is a center-tapped coil.

7. The receiver of claim 2 in which the threshold is set based on a time constant for the second resistor and the second capacitor.

8. A receiver comprising:
   an inductor having first and second terminals;
   a diode having first and second terminals, the first terminal of the diode coupled to the first terminal of the inductor;

a first capacitor having first and second terminals, the first terminal of the first capacitor coupled to the second terminal of the diode, the second terminal of the first capacitor coupled to the second terminal of the inductor;

a first resistor having first and second terminals, the first terminal of the first resistor coupled to the second terminal of the diode and to the first terminal of the first capacitor;

a first transistor having a first terminal coupled to the second terminal of the first resistor, and having a control terminal; and circuitry comprising:

a second transistor having a first and second terminals and a control terminal, the first terminal of the second transistor coupled to the first terminals of the first resistor and the first capacitor and to the second terminal of the diode;

a first operational amplifier (op-amp) having first and second inputs and an output, the first input coupled to the first terminals of the second transistor, the first resistor, and the first capacitor and to the second terminal of the diode, the output coupled to the control terminal of the second transistor;

a second op-amp having a first input coupled to the first input of the first op-amp, and having an output;

a second resistor having first and second terminals, the first terminal of the second resistor coupled to the output of the second op-amp, the second terminal of the second resistor coupled to the second input of the first op-amp; and a second capacitor having a terminal coupled to the second terminal of the second resistor and to the second input of the first op-amp.

9. The receiver of claim 8 in which a threshold is set based on a time constant for the second resistor and the second capacitor.

10. The receiver of claim 8 in which the diode is a first diode, and the receiver further comprises a second diode having first and second terminals, the first terminal of the second diode coupled to the first terminals of the second transistor, the first resistor, and the first capacitor and to the second terminal of the first diode, the second terminal of the second diode coupled to the second terminals of the inductor and the first capacitor.

11. The receiver of claim 10 in which the inductor is a center-tapped coil.

12. A receiver comprising:

an inductor having first and second terminals;

a diode having first and second terminals, the first terminal of the diode coupled to the first terminal of the inductor;

a capacitor having first and second terminals, the first terminal of the capacitor coupled to the second terminal of the diode, the second terminal of the capacitor coupled to the second terminal of the inductor;

a resistor having first and second terminals, the first terminal of the resistor coupled to the second terminal of the diode and to the first terminal of the capacitor;

a first transistor having a first terminal coupled to the second terminal of the resistor, and having a control terminal; and circuitry comprising:

a second transistor having a first and second terminals and a control terminal, the first terminal of the second transistor coupled to the first terminals of the resistor and the capacitor and to the second terminal of the diode;

an operational amplifier (op-amp) having first and second inputs, and having an output coupled to the control terminal of the second transistor;

an analog to digital converter (ADC) having an input coupled to the first terminals of the second transistor, the resistor, and the capacitor and to the second terminal of the diode, and having an output; and a digital to analog converter having an input coupled to the output of the ADC, and having an output coupled to the first input of the op-amp.

13. The receiver of claim 12 in which a threshold is set based on a resistor divider network coupled to the second input of the op-amp, the resistor divider network including:

a second resistor having a first terminal coupled to the input of the ADC, and a second terminal coupled to the second input of the op-amp; and a third resistor having a terminal coupled to the second terminal of the second resistor and to the second input of the op-amp.

14. The receiver of claim 12 in which the diode is a first diode, and the receiver further comprises a second diode having first and second terminals, the first terminal of the second diode coupled to the first terminals of the second transistor, the resistor, and the capacitor and to the second terminal of the first diode, the second terminal of the second diode coupled to the second terminals of the inductor and the capacitor.

15. The receiver of claim 14 in which the inductor is a center-tapped coil.

* * * * *